United States Patent
Welk et al.

[11] Patent Number: 5,828,585
[45] Date of Patent: Oct. 27, 1998

[54] VEHICLE SPEED SIGNAL CALIBRATION

[75] Inventors: Douglas Lynn Welk, Rossville; Thac Dinh Nguyen, Westfield, both of Ind.

[73] Assignee: Delco Electronics Corporation, Kokomo, Ind.

[21] Appl. No.: 785,182

[22] Filed: Jan. 17, 1997

[51] Int. Cl.[6] .................................................. G01C 25/00
[52] U.S. Cl. ..................... 364/571.01; 701/213
[58] Field of Search ............... 364/565, 571.01–571.08, 364/423.098, 424.027, 424.028, 424.029, 424.031, 449.7, 445.8, 449.9, 449.95, 457; 342/357, 358, 451, 457; 701/213–217, 224, 23–26, 1

[56] References Cited

U.S. PATENT DOCUMENTS

| | | | |
|---|---|---|---|
| 5,220,509 | 6/1993 | Takemura et al. | 364/449 |
| 5,276,451 | 1/1994 | Odagawa | 342/357 |
| 5,317,515 | 5/1994 | Matsuzaki | 364/454 |
| 5,483,457 | 1/1996 | Shibata et al. | 364/454 |

*Primary Examiner*—James P. Trammell
*Attorney, Agent, or Firm*—Jimmy L. Funke

[57] ABSTRACT

A system and method of automatically calibrating a vehicle speed sensor signal to provide an accurate speed signal for use in vehicle systems such as a navigation system. The navigation system receives GPS position information signals which are processed to determine current position. A compass provides an indication of the vehicle heading. The navigation system receives the vehicle speed sensor signal and counts the number of signal pulses during a time period. The system determines a pulse ratio of the vehicle speed sensor as a function of a GPS determined speed and the pulse count. The pulse ratio is subsequently used to calibrate the vehicle speed sensor signal. With the navigation system, the calibrated vehicle speed signal is used in connection with a dead reckoning technique for determining the position of the vehicle when GPS signals are unavailable.

14 Claims, 7 Drawing Sheets

VEHICLE SPEED SIGNAL CALIBRATION

BACKGROUND OF THE INVENTION

1. Technical Field

This invention relates generally to speed signal calibration and, more particularly, to a GPS based calibration system and method of providing accurate and updated calibration of a vehicle speed sensor signal.

2. Discussion

The concepts of intelligent vehicle highway systems (IVHS) are changing the future of ground transportation systems. In particular, navigation systems and Mayday Systems have been developed and are increasingly becoming available for use in assisting a mobile user. For example, on-board navigation systems are currently provided in some automotive vehicles to assist the driver of the vehicle in navigating the vehicle along a route or roadway system to reach a desired destination. Also, Mayday Systems are being developed for installation on vehicles as an aid for emergency situations.

Early navigation systems generally did not have the availability of advanced positioning systems such as the global positioning system (GPS). Instead, a number of early navigation systems often relied exclusively on dead reckoning techniques to account for a moving vehicle's location. Generally speaking, dead reckoning is the determination of position by advancing a known position using measured courses and distances. This generally involves determining a starting location and manually setting the vehicle's position on an electronic map. With the use of a dead reckoning technique, an approximate path of travel of the vehicle could be computed and updated as the vehicle is driven. The travel path determination has often been achieved with the use of a compass heading and vehicle speed information. However, many of the navigation systems which relied solely on dead reckoning techniques often failed to provide accurate and continuous navigation assistance and therefore required repeated corrections to the vehicle's computed position.

With the widespread availability of GPS, more recent navigation systems, as well as other systems such as Mayday systems, now rely primarily on GPS to provide position information to compute a vehicle's position. The development of the global positioning system (GPS) by the United States Department of Defense has greatly enhanced the ability to navigate. Currently, a constellation of twenty-four satellites are in place orbiting the earth at high altitudes and transmitting radio waves which contain position information. With the use of GPS receivers, the position information can be received and used to calculate the current latitude and longitude position coordinates at the receiving location. The global positioning system is currently achieving recognition as the superior position locator system for providing accurate worldwide fixes.

While modern vehicle systems rely primarily on GPS, navigation systems continue to include a back-up dead reckoning technique to handle those situations where GPS position information is unavailable. For example, GPS has been known to suffer from signal blockage which may be caused by tall buildings and other signal interferences. GPS signal blockage interference is also known as the occurrence of GPS fade. When the GPS signal is unavailable, the navigation system may continue to operate in accordance with the back-up dead reckoning technique to track an approximate position of the vehicle as the vehicle moves. Typical dead reckoning techniques store a set of position coordinates and determined vehicle speed and direction information, and use such information to determine an approximate location of the vehicle until the GPS signal can once again be used.

In order to determine vehicle speed, the vehicle is equipped with a vehicle speed sensor that generates a vehicle speed sensor (VSS) signal which must be accurately determinable. The vehicle speed sensor (VSS) signal has signal pulses, and when used on a particular vehicle has a pulses-per-mile ratio or other comparable ratio which varies among various automotive systems. Once installed and used in a vehicle, an aftermarket navigation system is generally required to be calibrated or otherwise configured to account for any possible speed or odometer deviations. Currently, speed and odometer calibrations generally require manual intervention and therefore are often labor intensive and time consuming. In the past, vehicle speed calibration generally required manual intervention to preconfigure the system for a specific rate or to enter the calibrated signal during the system installation or setup. Other techniques included driving a vehicle for a precise distance during a system calibration test. The conventional vehicle speed calibration approaches require substantial user intervention which makes such approaches less desirable.

It is therefore desirable to provide for a system and method of calibrating and updating the vehicle speed sensor signal for speed and/or odometer readings.

It is particularly desirable to provide for a navigation system which automatically calibrates the vehicle speed sensor signal to maintain an accurate vehicle speed signal.

It is also desirable to provide for a system and method of calibrating the vehicle speed sensor signal for use in an electronic device such as a navigation system.

It is further desirable to provide a system and method which may easily be integrated into a navigation system and installed in an automotive vehicle for use in providing an accurate speed signal, especially for use with a dead-reckoning technique.

SUMMARY OF THE INVENTION

In accordance with the teachings of the present invention, a system and method are provided for calibrating a vehicle speed sensor signal. The system includes a position sensing receiver for receiving GPS radio wave signals and determining a current position of the receiver from the received radio wave signals. The system receives a vehicle speed sensor signal indicative of the sensed speed of the vehicle. A controller provides for automatic calibration of the vehicle speed signal while GPS signal information is available. This is accomplished by the controller calculating the vehicle speed with GPS signal information and a vehicle speed sensor pulse rate. The controller determines a pulses-per-mile ratio for the vehicle speed sensor as a function of the calculated GPS determined vehicle speed and sensor pulse rate. The determined pulses-per-mile ratio is then used to provide an accurate speed reading for the vehicle.

According to one embodiment, the system and method of the present invention are provided in a navigation system which includes a dead reckoning mode of operation. The controller provides a back-up dead reckoning mode of operation for determining an approximate vehicle location when GPS position information is unavailable. The system also has a compass for providing an indication of the vehicle heading. The controller determines position location as a function of vehicle heading and the vehicle speed signal and automatically calibrates the vehicle speed signal when GPS signal information is available.

BRIEF DESCRIPTION OF THE DRAWINGS

Other objects and advantages of the present invention will become apparent to those skilled in the art upon reading the following detailed description and upon reference to the drawings in which.

DETAILED DESCRIPTION OF THE PREFERRED EMBODIMENT

Figure 1:
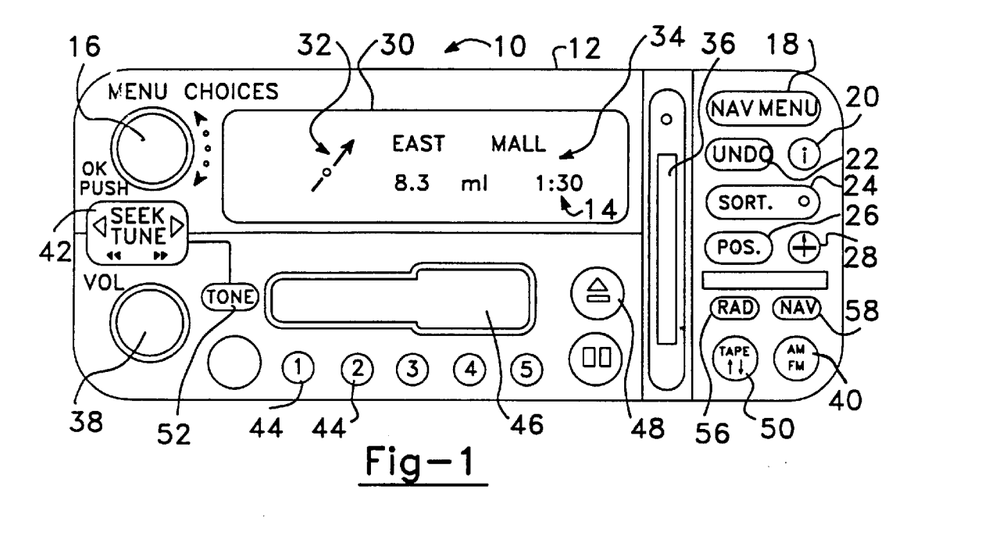
FIG. 1 is a front view of a navigation/audio entertainment system employing a system and method of automatically calibrating a vehicle speed signal according to the present invention.

Turning now to FIG. 1, a navigation/audio entertainment system 10 equipped with a system and method of calibrating a vehicle speed sensor signal is shown therein. The navigation/audio entertainment system 10 provides navigation services based on GPS position information and includes a dead-reckoning mode of operation as a back-up when GPS signals are unavailable. The dead reckoning back-up mode of operation requires a measurement of the vehicle position prior to the loss of the GPS signal, as well as the vehicle heading and vehicle speed information in order to calculate an approximation of the vehicle location. The navigation system as described herein determines vehicle speed by using a vehicle speed sensor (VSS) signal, and the system and method of the present invention provide for automatic calibration of the vehicle speed sensor signal. While calibration of the vehicle speed sensor signal is described in connection with a dead reckoning back-up mode of operation for a navigation system as described herein, it should be appreciated that the vehicle speed sensor signal calibration may be used in other systems and for various other applications.

The navigation/audio entertainment system 10 of FIG. 1 integrates both a navigation system and an audio entertainment system of the type generally configured for installation in an automotive vehicle. While the embodiment of a navigation/audio entertainment system 10 is shown, the system and method of providing vehicle speed sensor signal calibration according to the present invention may be applicable for use in any GPS-based system that uses vehicle speed. It should also be appreciated that other systems such as Mayday systems, various audio entertainment systems or combinations of audio systems may be used separately or may be combined with the navigation system or other systems. Also, an audio compact disc (CD) player could be employed in addition to or in place of the audio cassette tape player 46 that is shown. It is also conceivable that destination-related information could be stored on and retrieved from a compact disc or cassette.

The navigation/audio entertainment system 10 is shown integrally packaged with an audio entertainment system. The navigation/audio entertainment system 10 has a face plate 12 which includes the "MENU CHOICES" rotary/pushbutton 16, navigation menu "NAV MENU" pushbutton 18, information "I" pushbutton 20, "UNDO" pushbutton 22, sort by distance "SORT" pushbutton 24, position "POS" pushbutton 26 and current direction heading pushbutton 28. The integrated navigation/audio entertainment system 10 similarly has a guidance display 30 that is commonly shared among the navigation, audio radio and audio cassette tape modes of operation. That is, display 30 will provide the direction indicating arrow 32 with the destination information 34 when in the navigation display mode. However, display 30, when in the audio radio display mode, will generally display AM or FM frequency selections, in addition to the time-of-day and various types of radio related information. When in the audio cassette tape display mode, the display 30 will display information pertaining to the cassette tape operation and the time-of-day information.

The navigation/audio entertainment system 10 is equipped with a memory card interface 36 for receiving a selected memory card and accessing information stored on the memory card. The stored information on the memory card may include destination-related information. The memory card is about the size of a credit-card and is preferably formatted to PCMCIA standards. The use of PCMCIA standard connections to the card not only helps maintain low cost but also provides other advantages which also will hereinafter be explained.

For navigation purposes, the memory card interface 36 reads destination-related information from a memory card that contains a large number of destinations which are preferably categorized. That is, each destination memory card would contain a selected type of database, as for example a camping information directory, a business directory, a restaurant/hotel directory, etc. for covering a given geographic territory. Each destination memory card provides categorized destinations with corresponding latitude and longitude position coordinates within a predefined territory and may also include alphanumeric text information pertaining to each of the destinations. A more detailed description of the navigation system is discussed in U.S. patent application Ser. No. 08/418,933 filed Apr. 7, 1995, entitled "Mapless GPS Navigation System in Vehicle Entertainment System" and assigned to the assignee of the present invention. The aforementioned patent application is hereby incorporated by reference.

Still further, the PCMCIA memory card could be made with programmable memory that is inherently non-volatile or that has a battery back-up on the memory card. Such a memory card is typically more expensive than the PCMCIA standard card but would offer added flexibility in programming. A user could therefore save destination-related information on such a programmable memory card. One could even program such a programmable PCMCIA memory card with selected destination information on one's personal computer and then use the PCMCIA memory card in an audio/navigation system such as that described herein. Accordingly, use of the PCMCIA memory card for replaceable memory in this invention opens up a myriad of possibilities for types of data bases that might be stored on them for use in the system 10.

The integrated navigation/audio entertainment system 10 is shown also containing various audio radio and cassette tape controls. More particularly, an AM/FM frequency band selection control pushbutton 40 toggles between the AM and FM radio frequency bands. A momentary pushbutton rocker switch 42 provides pushbutton frequency tuning selection and radio frequency seek control. In cooperation with "TONE" pushbutton switch 52, control switch 42 enables selection of various audio sound parameters such as treble, bass, fade, balance and auto volume settings. Five user programmable station preset pushbuttons 44 are available for storing and recalling programmed radio frequency selections from electronically erasable programmable read only memory (EEPROM). Each of the five pushbuttons 44 may access at least three memory locations which, in a radio receiver mode, stores one AM frequency selection frequency and two FM frequency selections.

The integrated navigation/audio entertainment system 10 as shown in FIG. 1 also includes an audio cassette tape player 46. The cassette tape player 46 receives and reads stored audio information on an audio cassette tape (not shown) as is well known in the art. Audio cassette tape player 46 has function controls which include a tape eject pushbutton 48 and a side selector pushbutton 50 for selecting between the first and second sides of an audio cassette tape.

Also, the integrated navigation/audio entertainment system 10 has a radio mode of operation "RAD" pushbutton 56 for selecting the radio display mode of operation. Further, the navigation/audio entertainment system 10 has a navigation mode of operation "NAV" pushbutton 58 for selecting the navigation display mode of operation.

Figure 2:
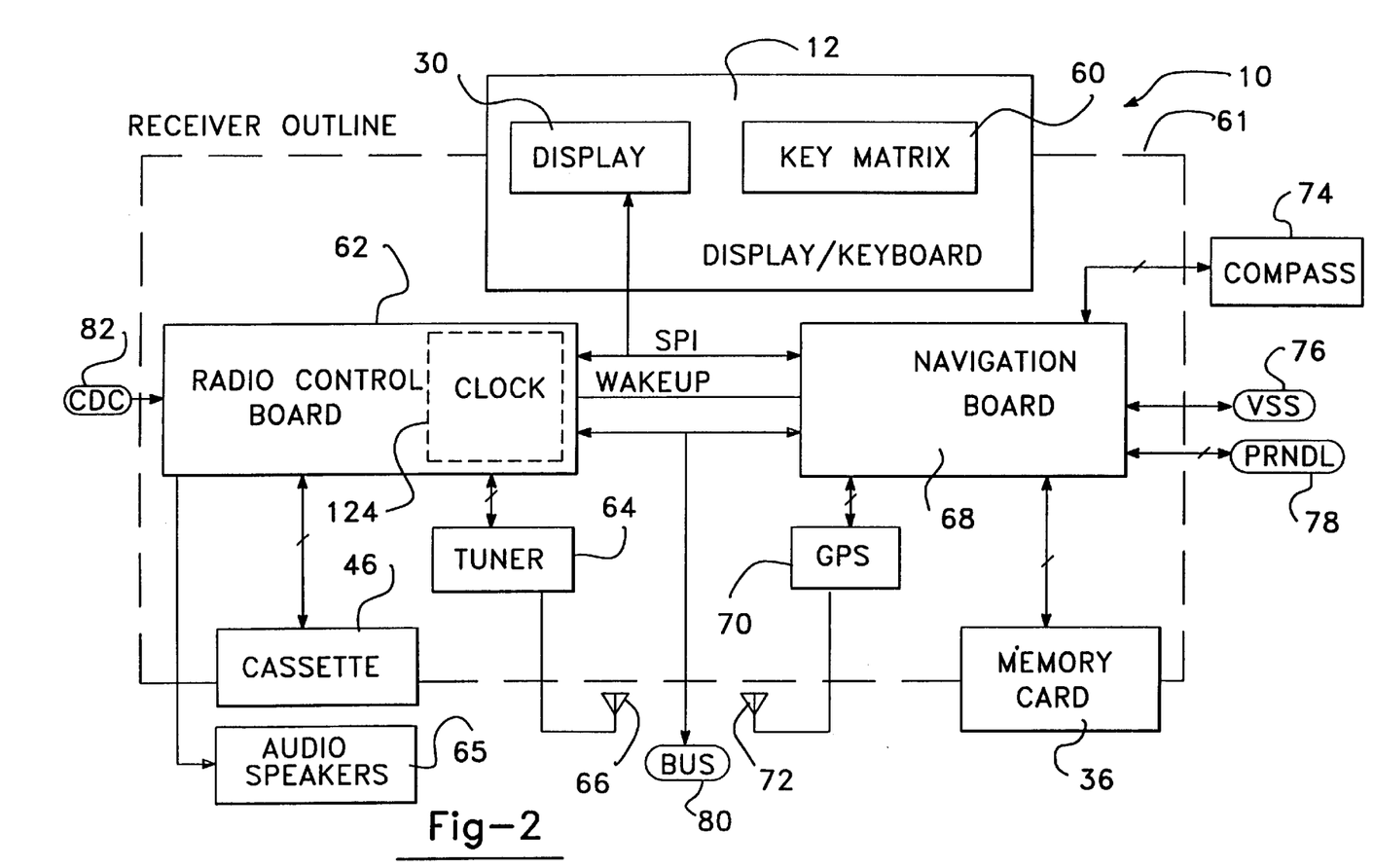
FIG. 2 is a block diagram of the integrated navigation/audio entertainment system shown in FIG. 1.
Figure 3:
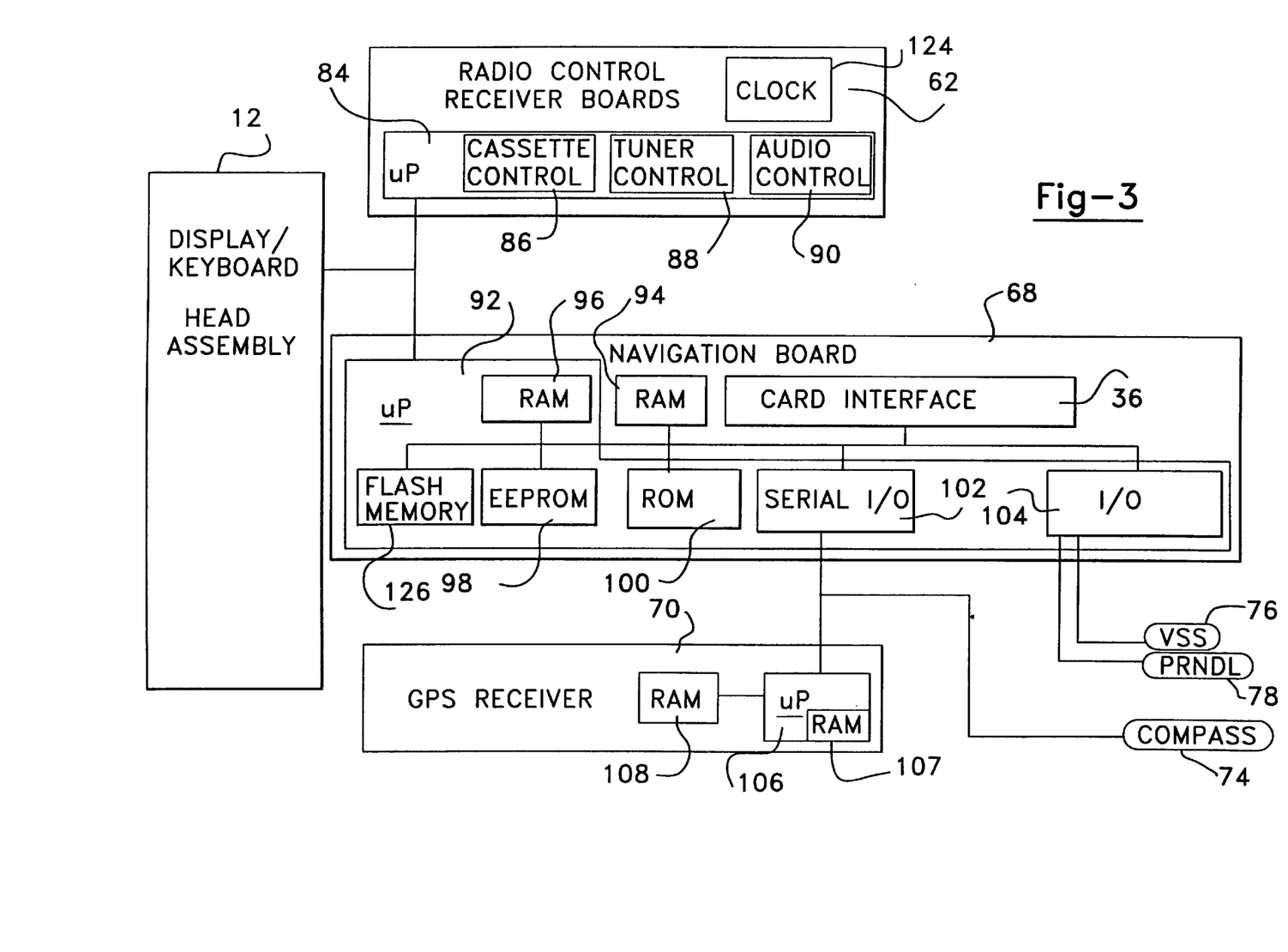
FIG. 3 is a block diagram further illustrating the navigation/audio entertainment system of FIG. 1.

Referring to FIGS. 2 and 3, the navigation/audio entertainment system 10 is further shown to include various interconnected electronics and processing components and signal inputs. As mentioned above, the face plate 12 encompasses shared display 30 and the various user controls as represented by key matrix 60. The housing of system 10 is generally represented by reference numeral 61. Packaged within housing 61 is the audio cassette tape player 46, the memory card interface 36, a radio control board 62 and a navigation board 68. The radio control board 62 is connected to a radio tuner 64 and the audio cassette tape player 46. The radio tuner 64 is further coupled to an externally located radio antenna 66 for receiving radio wave signals. In addition, audio speakers 65 are generally coupled to the radio control board 62.

The radio control board is shown including a clock 124 which contains an internal chronometer, preferably based on a quartz time piece, for measuring time. Clock 124 measures time and may be periodically updated with GPS-based time calculations. Also, clock 124 allows the system to maintain good time estimates when GPS time computations are not available, though accuracy may degrade as the period of GPS outage grows longer, depending on the accuracy of the clock 124. While the clock 124 is shown with the radio control board, it should be appreciated that the clock 124 may be located most anywhere within system 10.

The radio control board 62 communicates with the navigation board 68 via an array of communication lines including SPI and WAKEUP lines. The navigation board 68 is connected to the memory card interface 36 and a GPS receiver 70. The GPS receiver 70, in turn, is connected to a GPS antenna 72. According to well known GPS operations, the GPS receiver 70 receives GPS radio wave signals via the GPS receiving antenna 72. The GPS radio wave signals are emitted from existing GPS satellites. Currently, a constellation of twenty-four known high altitude GPS satellites are in orbit and available to provide continuous worldwide position fixes in all types of weather conditions. The GPS receiver 70 has a built-in processing unit and memory for processing the GPS radio wave signals to determine the latitude and longitude coordinates of the current position, as well as determining the current direction of travel and vehicle speed.

More specifically, the GPS receiver 70 continuously receives radio wave signals from the GPS antenna 72 and determines accurate position coordinates which identify the location of the received signals. This determination includes calculating the distance from various satellites to determine a location relative thereto. By measuring the current signals sent by the GPS satellites and knowing orbital parameters of the satellites, the GPS receiver 70 is able to determine the location of the receiver 70 and generate longitude and latitude position coordinates identifying the position of the received signals.

More particularly, with the received GPS signals, the latitude and longitude position coordinates of the GPS receiver 70 are determined by computing distance from each of several GPS satellites currently visible to the receiver 70 by direct line-of-sight. Distance is determined by precise computation of the time required for radio signals to travel from the GPS satellite to the GPS receiver 70. Combined with precise information about the satellites' positions relative to the earth, precise latitude and longitude coordinates are computed.

In addition to determining precise latitude and longitude position coordinates, the GPS receiver 70 may also compute an accurate time-of-day and date from the GPS radio wave signals. The GPS receiver 70 receives signals from four satellites and solves for travel time which is used to compute distance from the satellites to the receiver. The radio wave information is commonly encoded in a spread spectrum transmission. Accordingly, the time-of-day and date information is computed as a byproduct of solving for the location, since time is included in the pulses of information.

At speeds greater than a few miles per hour, the GPS receiver 70 can also determine a precise direction of travel. The receiver 70 determines rate of change in range or relative speed to each visible satellite. Combined with precise knowledge of satellite orbits and the earth's rotation, the ground velocity (i.e., speed and direction) of the GPS receiver 70 can be precisely determined. The determined direction heading is preferably used as a reference while the vehicle is moving at a speed of greater than five miles per hour, for example.

GPS is widely known and should be understood to those skilled in the art as a means for providing accurate position location information with an accuracy within one-hundred (100) meters or better for over ninety-five percent (95%) of the time. It should also be understood that enhanced accuracy may be obtained with GPS now and in the future. For example, a differential receiver could also be employed to provide the availability of differential GPS which offers enhanced position determining accuracy.

The navigation board 68 receives a number of signal inputs which include a signal indicative of the vehicle direction heading as generated by a magnetic flux gate compass 74 according to one embodiment. According to a second embodiment, the direction heading signal may alternately be generated with a gyro compass. The gyro compass offers the advantage of immunity to magnetic noise such as is common in urban environments and near power distribution centers. Accordingly, the gyro compass may be more desirable when GPS blockages combined with high magnetic noise levels can be expected. The direction heading indication provided by compass 74 is used as back-up heading information which serves as a reference for determining straight-line direction to a selected destination when the vehicle's speed drops below five miles per hour. The direction heading signal from compass 74 is also used with the back-up dead reckoning system when GPS is unavailable.

Additionally, a vehicle speed sensor (VSS) signal 76 is received by the navigation board 68 to provide an indication of the vehicle's speed as detected with a vehicle speed sensor. Also received by the navigation board 68 is a transmission position (PRNDL) signal 78 which provides an indication of a forward or reverse direction of travel of the vehicle. Together, the direction heading signal provided by compass 74, as well as the vehicle speed sensor signal 76 and transmission position signal 78, allow for the backup dead-reckoning system to complement the GPS position coordinates.

With particular reference to FIG. 3, the radio control receiver board 62 is shown to contain a microprocessor 84. The radio control receiver board 62 is also equipped with memory such as EEPROM (not shown). The radio control microprocessor 84 generally handles the audio entertainment controls. For instance, microprocessor 84 functions as an audio cassette tape control 86 for controlling the audio cassette tape player 46. In addition, microprocessor 84 also operates as a tuner control 88 and an audio control 90 for controlling the audio radio and sound operations as should be evident to one skilled in the art.

The navigation board 68 also contains its own navigation control microprocessor 92 for controlling the primary navigation functions of the present invention. The microprocessor 92 has built-in random access memory (RAM), flash memory 126, electronically erasable programmable memory (EEPROM) 98, read only memory (ROM) 100, a serial input/output 102 and an input/output 104. The EEPROM 98 and ROM 100 generally contain the necessary programmed instructions for performing the primary calculations to determine distance and direction to selected destinations. Also included on the navigation board 68 is random access memory (RAM) 94 and the memory card interface 36. The random access memory (RAM) 96 or 94 preferably contains programmable memory locations for storing destination information and for continually storing variables used to determine the direction and distance information as processed by the navigation control microprocessor 92. The flash memory 126 preferably contains the downloaded information from one or more memory cards.

The GPS receiver 70 also includes a built-in GPS control microprocessor 106 and random access memory (RAM) 108. Microprocessor 106 also contains built-in random access memory (RAM) 107. The random access memory (RAM) 107 or 108 preferably stores the radio wave signals received from the GPS receiving antenna 72 for processing. The GPS control microprocessor 106 processes the received radio wave signals and calculates the current latitude and longitude position coordinates thereof, in addition to computing the vehicle speed, current time of day and date and calculating the current direction of travel of the vehicle. The calculated position coordinates, vehicle speed, time, date and direction data may thereafter be stored in RAM 107 or 108. The vehicle speed and direction data together provide for a velocity signal.

Figure 4:
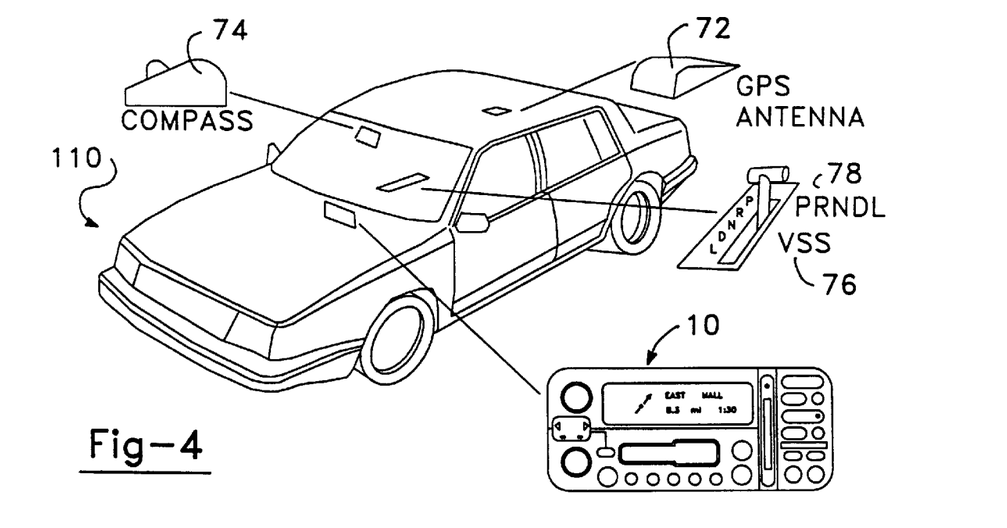
FIG. 4 is a view of an automotive vehicle equipped with the system and method of the present invention.

According to a preferred embodiment, the system 10 may easily be mounted in an automotive vehicle 110 as shown in FIG. 4. According to the automotive vehicle application, the navigation system 10 may easily be mounted within the dash of the vehicle 110 in a manner similar to the mounting of a car radio. Accordingly, the key matrix 60 and display 30 are easily accessible by the driver or a passenger in the vehicle 110. The magnetic flux compass 74 is located near the upper midportion of the windshield near or within the rearview mirror assembly. The vehicle speed sensor (VSS) signal 76 and transmission position (PRNDL) signal 78 are taken from the vehicle transmission. The GPS antenna 72 is preferably mounted on the roof of the vehicle 110 and exposed to available GPS radio wave signals.

Figure 5:
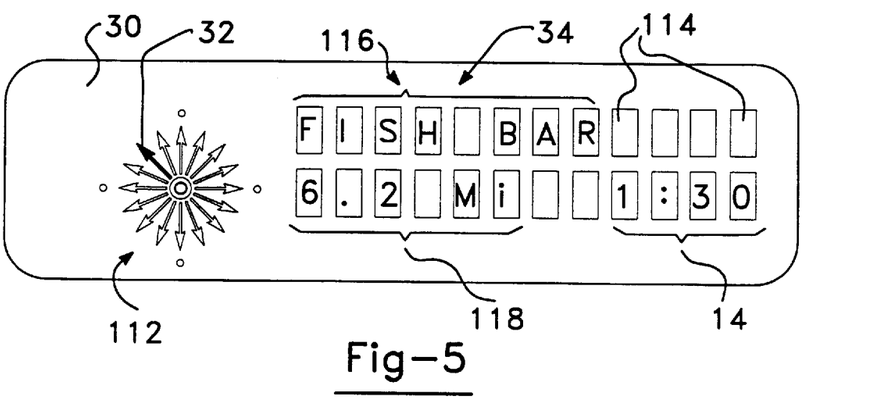
FIG. 5 is a schematic view of display graphics for displaying navigation information.

With particular reference to FIG. 5, the display 30 is shown in an enlarged schematic view. The display 30 is a simplistic and inexpensive alphanumeric text with direction pointing arrow display. According to one embodiment, display 30 is a vacuum fluorescent (VF) display. Alternately, display 30 may include a liquid crystal display (LCD) equipped with back-lighting. It should be appreciated that various types of displays can be used.

The display 30 shown includes a direction pointing arrow display 112 containing a plurality of equi-angular direction pointing arrows such as arrow 32. According to the embodiment shown, direction pointing display 112 includes sixteen possible arrow selections equi-angularly displaced 22.5_ about a 360_ rotation. The appropriate direction pointing arrow such as arrow 32 is selected and actively displayed as a darkened arrow to provide an indication of the straight-line direction from the current position of the GPS receiver 70 to a selected destination. The arrow direction may vary and is determined by the calculated direction as referenced to the current vehicle heading provided by the GPS receiver 70 or backup compass 74. The direction pointing arrow 32 pointing upward indicates that the destination is directly ahead of the vehicle, while the direction pointing arrow 32 pointing downward indicates that the destination is directly behind the vehicle. The direction pointing arrow 32 pointing to the right indicates that the destination is to the right and that the driver of the vehicle may turn the vehicle when appropriate. Likewise, the direction pointing arrow 32 pointing to the left indicates that the destination is to the left.

The navigation display 30 further includes alphanumeric character displays 114 for displaying alphanumeric characters. Character displays 114 each preferably include an array of segments, pixels or a dot matrix for economically displaying alphanumeric characters such as individual alphabetical, numeric or other symbolic characters. The display 30 is equipped with a limited number of character displays 114. As shown, a total of twenty-four character displays 114 are divided between a top line and a bottom line of text. The text information 34 may include various menu categories, sub-categories, destinations, distance information, and a wide variety of alphabetical, numerical and text information. As shown in FIG. 5, a destination name 116 is provided on the top line. Displayed on the bottom line is a distance 118 as determined from the current position to the selected destination. While the distance 118 shown is displayed in miles, the metric equivalent of the distance in kilometers (km) could likewise alternately be displayed. Also, displayed on the bottom line is a digital reading of the time 14 of day as measured by clock 124. While the time 14 shown includes the hour and minutes, seconds and split seconds could also be displayed. Furthermore, the computed date could also be displayed.

Figure 6:
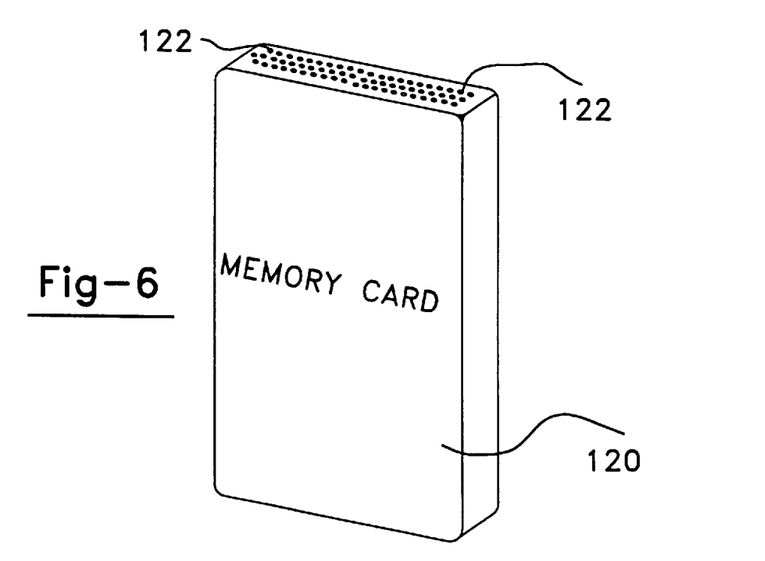
FIG. 6 illustrates a readable PCMCIA standard memory card containing navigation related information for a geographic territory.

Referring to FIG. 6, a preferred memory card 120 that can be used to provide the destination data base is shown therein. According to one embodiment, the memory card 120 is formatted to PCMCIA standards and contains information that is stored on read only memory (ROM) or programmable memory within the memory card 120. One example of the PCMCIA memory card 120 is Model No. FE02M-20-10038-01 manufactured and sold by Centennial Technologies, Inc. This particular memory card 120 has a PCMCIA standard interface which includes a total of sixty-eight female electrical connector holes 122 provided at the connector end for receiving pin connectors within the memory card interface 36. It should be appreciated that a plurality of memory cards 120 may be selected from to access destination-related information that is made available for a predefined geographic territory.

Figure 7:
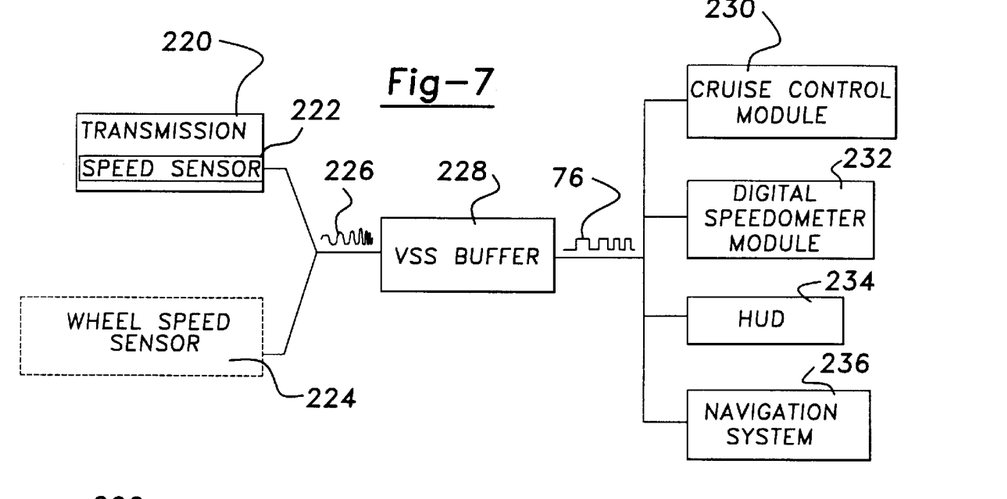
FIG. 7 is a block diagram illustrating the generation and use of a vehicle speed sensor signal.

The vehicle 110 monitors vehicle speed and generates a vehicle speed signal which is used in connection with various vehicle systems. According to one embodiment, the vehicle 110 is equipped with a speed sensor 222 that is operatively coupled to the vehicle's transmission 220 for monitoring the speed of rotation of a rotating shaft of the transmission 220. Preferably, the speed sensor 222 measures rotational speed of the output shaft of the transmission 220. The speed sensor 222 generates a quasi-sinusoidal signal which has a signal response proportional to the vehicle's speed. Alternately, a wheel speed sensor 224 may be employed to generate the quasi-sinusoidal vehicle speed signal by monitoring the wheel speed. Speed sensors 222 or 224 may include a hall-effect or variable-reluctance sensor such as model no. 1AV2A manufactured and sold by Honeywell.

The unbuffered vehicle speed signal 226 is applied to a vehicle speed signal buffer 228 which produces a square-wave vehicle speed signal 76. The square-wave speed signal 76 contains a series of pulses, and the number of pulse-per-second provides an indication of the vehicle speed. The square-wave vehicle speed signal 76 is made available as an input to various control modules within the vehicle to provide an indication of the vehicle speed. For example, the vehicle speed signal 76 may be used by the cruise control module 230, a digital speedometer module 232, a head-up-display (HUD) 234, a navigation system 236, and various other vehicle systems. When used in connection with the navigation system 236, for example, the vehicle speed signal 76 can be used to determine the vehicle speed by dividing the vehicle speed signal pulses-per-second by the pulses-per-mile ratio for the given vehicle, and factoring in a conversion factor of 3,600 seconds-per-hour. The vehicle speed equation is provided in the following equation:

$$\text{Vehicle Speed} = \frac{\text{pulses-per-second}}{\text{pulses-per-mile ratio}} \times \frac{3,600 \text{ seconds}}{\text{hour}}$$

In order to determine vehicle speed, the system of interest, such as navigation system 236, must consider the pulses-per-mile ratio associated with that particular vehicle. Amongst the various vehicles, the pulses-per-mile ratio may vary among vehicle manufacturers and also between various automotive vehicle models. For example, one vehicle may be equipped with a speed sensor that has a pulse ratio of 4000 pulses-per-mile, while another vehicle equipped with a speed sensor may have a pulse ratio of 2000 pulses-per-mile. Installation of a navigation system in the two vehicles would realize two different vehicle speeds, unless the speed signal is properly calibrated. Accordingly, the vehicle speed signal may require calibration before the vehicle speed signal can be accurately used in a particular system.

According to the present invention, the vehicle speed signal calibration can be automatically determined by monitoring the vehicle speed during a period of time in which the vehicle speed signal pulses are precisely accumulated. The pulses-per-mile ratio may be computed according to the following equation:

$$\text{Pulses-per-mile Ratio} = \frac{\text{Pulses-per-second}}{\text{Vehicle Speed}} \times \frac{3,600 \text{ seconds}}{\text{hour}}$$

When global positioning system (GPS) signals are available, the vehicle speed can be accurately obtained from the received GPS data. The availability of GPS valid signals allows for determination of vehicle speed and enables the aforementioned pulses-per-mile ratio equation to be used in the automatic calibration of the vehicle speed sensor signal.

Figure 8:
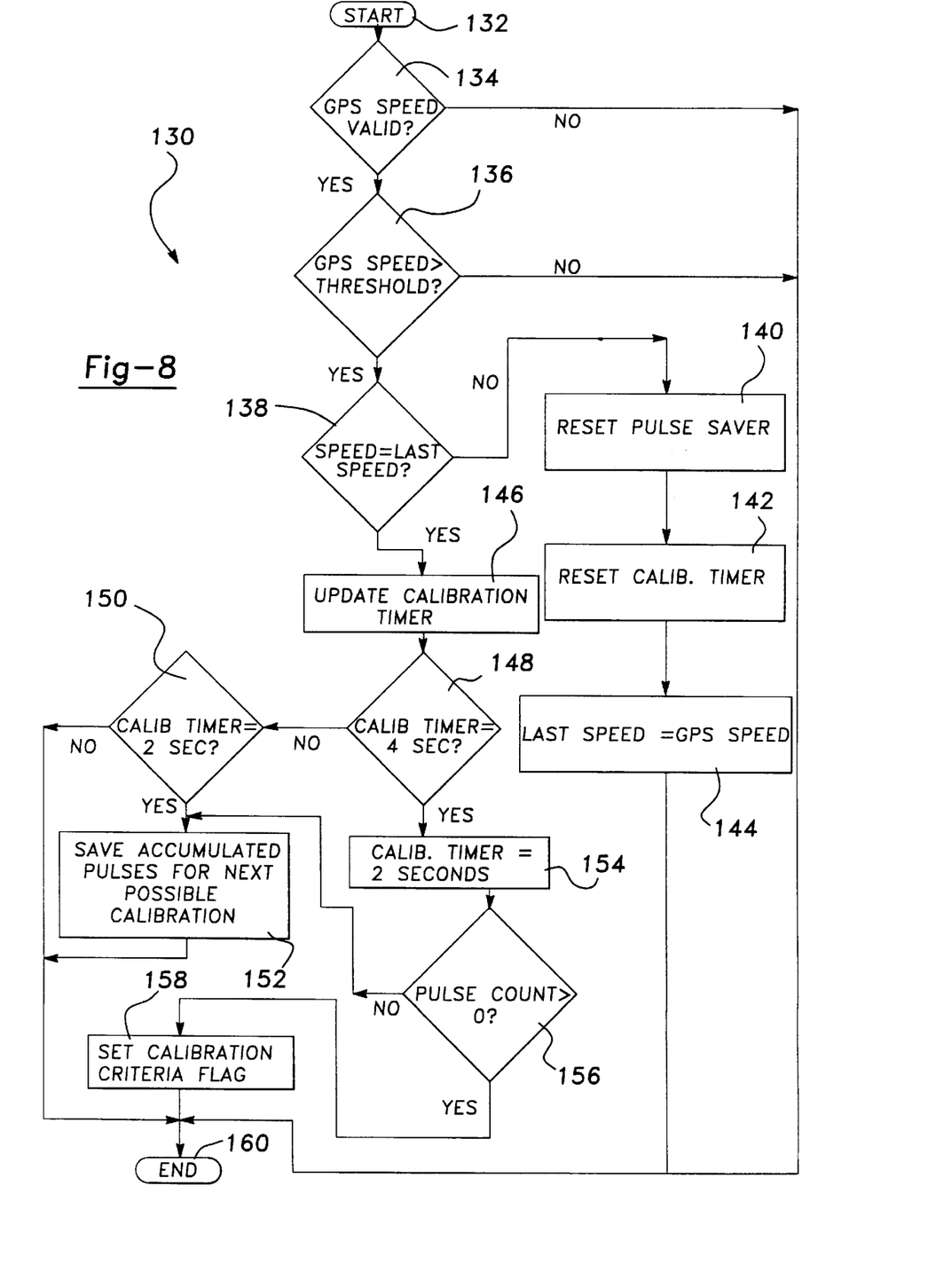
FIG. 8 is a flow diagram illustrating a method of checking calibration criteria for performing a vehicle speed signal calibration.
Figure 9:
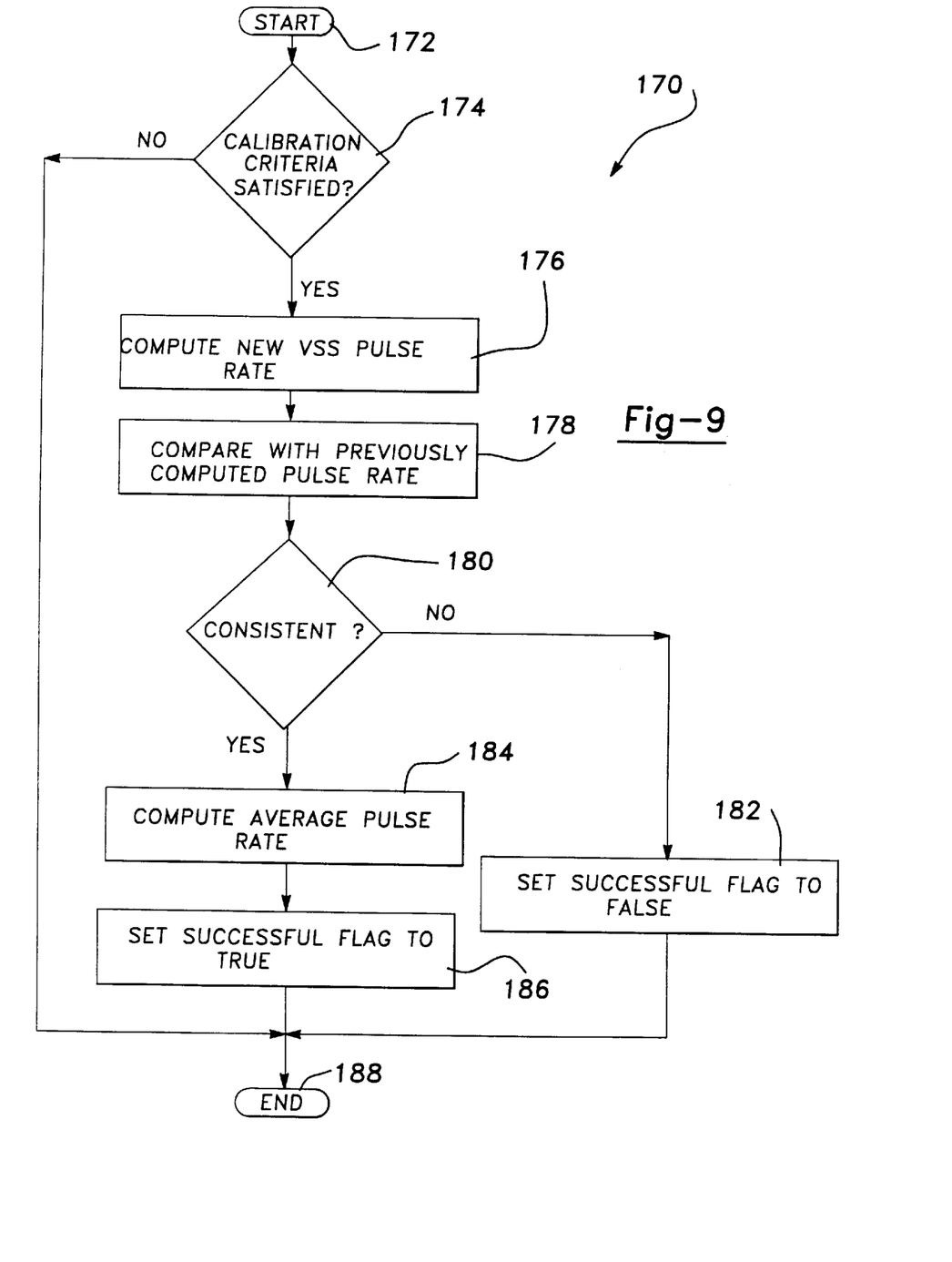
FIG. 9 is a flow diagram illustrating a method of calibrating the vehicle speed signal according to the present invention.

To ensure accuracy in determining the pulses-per-mile ratio, it is preferred that certain calibration criteria be satisfied. Referring to FIG. 8, methodology 130 illustrates the calibration criteria that are to be satisfied prior to performing a calibration of the vehicle speed sensor signal. Methodology 130 begins with start block 132 and proceeds to decision block 134 to check if the GPS speed is valid. A GPS speed preferably requires that the GPS speed is available and accurate enough to be used in the pulses-per-mile ratio equation. If the GPS speed is not valid, methodology 130 is complete pursuant to end block 160. If the GPS speed is valid, methodology 130 proceeds to decision block 136 to check if the GPS speed is greater than a minimum predetermined threshold value, and if not, is complete pursuant to block 160. If the GPS determined speed exceeds the minimum threshold value, decision block 138 checks if the current speed is equal to the last speed to ensure that a substantially constant vehicle speed is provided before calibration is allowed. If the current speed is not equal to the last speed, methodology 130 will reset the pulse saver 140, reset the calibration timer pursuant to block 142, and set the last speed equal to the GPS determined speed pursuant to block 144, and thereafter is complete pursuant to end block 160.

If the current speed is determined to be equal to the last speed in decision block 138, methodology 130 will proceed to update a calibration timer as provided in block 146, and thereafter decision block 148 checks to see if a calibration timer is equal to a predetermined time period of four seconds. If the calibration timer is set equal to four seconds, the calibration timer will then be set equal to two seconds pursuant to block 154, and decision block 156 will check to see if the pulse count is greater than zero. If not, methodology 130 will proceed to block 152 to save the accumulated pulses for the next possible calibration. However, if the pulse count is greater than zero, as determined by decision block 156, methodology 130 will proceed to set the calibration criteria flag pursuant to block 158, and is complete pursuant to end block 160.

Returning to decision block 148, if the calibration timer is determined not to be equal to four seconds, decision block 150 will check to see if the calibration timer is set equal to two seconds. If not, methodology 130 will be complete pursuant to end block 160. However, if the calibration timer is set equal to two seconds, methodology 130 will proceed to save the accumulated pulses for the next possible calibration and thereafter be complete pursuant to end block 160.

Accordingly, in order for the calibration of the vehicle speed sensor signal to be performed, GPS data must be available and valid and accurate enough to be used to determine the pulses-per-mile ratio in accordance with the calibration procedure. In addition, GPS speed must remain constant for at least a minimum time period, for example of four consecutive seconds, before calibration is allowed. According to one embodiment, the GPS data is updated once per second and the GPS data is processed to provide usable data, i.e., position, velocity and heading information. In the navigation system architecture, the GPS module is executed once per second and the GPS data is processed in the next one-second interval after the GPS data is received. This process can contribute up to a two-second delay in reporting the vehicle speed. The vehicle speed signal pulses are therefore accumulated in the first two seconds of the four-second interval and wait for two additional seconds before being used in the calibration. The two additional seconds of constant speed are preferably provided to ensure that the vehicle is neither accelerating nor decelerating, which may effect the pulse count in the first two seconds.

Furthermore, the GPS speed must be greater than a minimum speed threshold, since GPS speed is more accurate when the vehicle is moving at a speed greater than nine miles per hour, for example. However, the selected threshold is greater than nine miles per hour for the following reasons: to ensure that the vehicle is not moving along a small curve and is not turning since such turns may introduce errors into the GPS signal; and the number of pulses accumulated per integration interval is an integer which may not correspond exactly to a mile-per-hour value, especially for low pulses-per-mile ratio. For higher speed, more pulses will be accumulated and thus reduce the error caused by the fractional part of the pulse count in an interval.

With particular reference to FIG. 8, a calibration methodology 170 is shown for calibrating the vehicle speed signal according to the present invention. Calibration methodology 170 begins with start block 172 and proceeds to decision block 174 to check whether the calibration criteria are satisfied. If the calibration criteria are not satisfied, calibration methodology 170 is complete pursuant to end block 188. Once the calibration criteria are satisfactory, calibration methodology 170 will proceed to compute the new vehicle speed signal pulse rate pursuant to block 176, and thereafter compare the vehicle speed signal pulse rate with the previously computed pulse rate pursuant to block 178. Decision block 180 will then check to see if the comparison is consistent. If the newly computed vehicle speed signal pulse rate is not consistent with the previously computed pulse rate, calibration methodology 170 will set a successful flag to false pursuant to block 182, and thereafter is complete pursuant to end block 188. However, if the new vehicle speed signal pulse rate is consistent with the previously computed pulse rate, calibration methodology 170 will proceed to compute an average pulse rate pursuant to block 184, and thereafter set a successful flag to true pursuant to block 186 before completing methodology 170 pursuant to end block 188.

Once the vehicle speed signal is properly calibrated to the appropriate pulse rate, the speed signal may be employed in various systems on the vehicle. In conjunction with a navigation system, the calibrated vehicle speed signal can be used for a dead-reckoning technique. A dead-reckoning technique may be employed to provide an estimation of the position of a vehicle as it moves from one location to another location and so on. According to the example of a navigation system described herein, the dead-reckoning technique is used as a backup system when GPS signals are unavailable.

When the GPS solution is not available, the new location is calculated from the old (e.g., last determined) location, the compass data and vehicle speed sensor information. With the dead reckoning sensor information, given the vehicle speed sensor signal 76, the transmission position signal 78, compass reading 74 and time related information, the navigation board microprocessor 92 is able to determine an approximate expected location of the mobile vehicle, despite the unavailability of GPS signals.

Currently, existing global positioning systems have been known to suffer from signal blockage caused by tall buildings and other interferences. When the GPS signal is unavailable, the present invention takes into account for any such interferences and enables the navigation system 10 to continue to operate despite the occurrence of GPS interference or other causes of unavailability of GPS. For example, in a typical urban environment, a vehicle may travel a roadway system between various tall buildings in which the GPS radio wave signals may be blocked by an obstruction caused by nearby buildings. This interference condition is known as the occurrence of GPS fade. In order to handle the GPS fade scenario, the navigation system 10 advantageously stores the last set of position coordinates, the calculated speed and direction information, in addition to the time that the last position coordinates were recorded.

Figure 10:
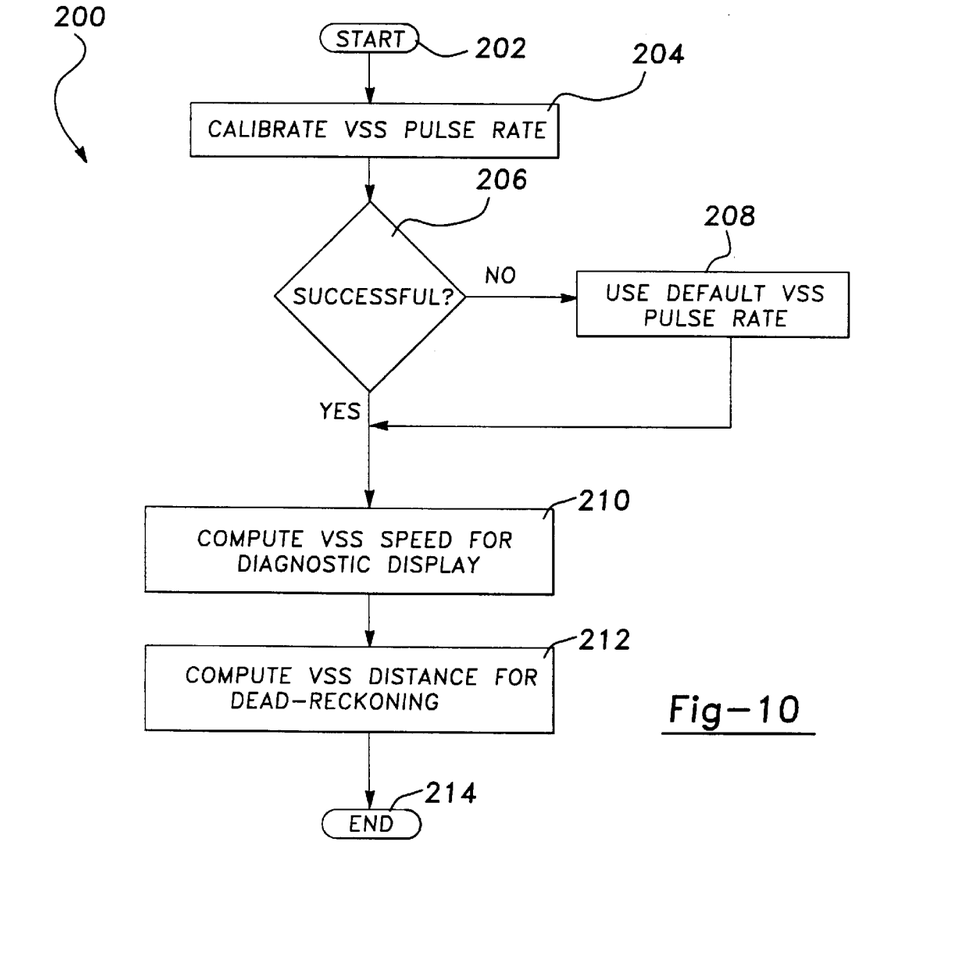
FIG. 10 is a flow diagram illustrating a method of computing the vehicle speed and determining an odometer reading for use in a dead reckoning technique with the navigation system.

FIG. 10 shows how the calibrated vehicle speed signal is used in accordance with a dead-reckoning technique. The dead-reckoning methodology 200 begins with start block 202 and proceeds to calibrate the vehicle speed signal pulse rate pursuant to block 204. Dead-reckoning methodology 200 then proceeds to decision block 206 to check if the calibration of the vehicle speed signal pulse rate has been successful, and if so, proceeds to compute the vehicle speed sensor signal for diagnostic display as provided in block 210. However, if the calibration is not successful, block 208 provides that methodology 200 will use a default vehicle speed sensor signal pulse rate which may be programmed into the navigation system. Once the vehicle speed signal is computed for the diagnostic display, methodology 200 will compute the vehicle speed signal distance for the dead-reckoning technique according to block 212, and thereafter be complete pursuant to end block 214.

The calibration procedure described herein may employ a GPS measurement error filter (not shown). GPS measurement errors are correlated. Therefore, an averaging filter for the calibration values can cancel out some of the measurement errors, if any. The following equation may be used in the averaging filter:

$$\text{New Rate} = \frac{K-m}{K} \text{ (previous rate)} + \frac{m}{K} \times \text{(new rate)}$$

where K is the tunable filter gain, m is set equal to zero for the first calibration, and m is set equal to one for subsequent calibrations.

In contrast to the four second calibration example provided herein, the system and method of the present invention, in accordance with an alternate embodiment, may use an overlapping four-second window in which it is possible to recalibrate the vehicle speed sensor signal in a reduced time period of two seconds. This is accomplished by determining pulses used in a current calibration while at the same time determining GPS speed used in the previous calibration.

Further, the vehicle speed sensor pulse counts should be consistent to ensure good calibration. For example, hardware failure which may occur while vehicle speed sensor pulses are accumulated for the next calibration may create a large change in the calibration value even when GPS speed remains constant. Such a consistency check will detect such dramatic changes and discard the newly computed pulse rate. The system will be reset to wait for another good pulse count and then reset the calibration process.

Accordingly, the present invention uses GPS position information to perform vehicle speed sensor rate calibration without requiring user intervention. The vehicle speed sensor calibration further allows for calibration of a vehicle odometer.

While this invention has been disclosed in connection with a particular example thereof, no limitation is intended thereby except as defined in the following claims. This is because a skilled practitioner recognizes that other modifications can be made without departing from the spirit of this invention after studying the specification and drawings.

The embodiments of the invention in which an exclusive property or privilege is claimed are defined as follows:

1. A system for calibrating a vehicle speed sensor signal for use in a vehicle, said system comprising:

a speed sensing receiver for receiving reference signals and determining a current speed of the vehicle from said received reference signals;

an input for receiving a vehicle speed sensor signal that is generated by a vehicle speed sensor, said speed sensor signal being a pulsed signal having a pulse ratio that is a function of a particular number of pulses per distance;

a counter for counting pulses of the vehicle speed sensor signal during a time period; and a controller for providing automatic calibration of the vehicle speed sensor signal while the reference signals are available, wherein the controller determines a pulse-per-distance ratio of the vehicle speed sensor signal as a function of the vehicle speed determined from the reference signals and the pulse count from the counter.

2. The system as defined in claim 1 wherein said speed sensing receiver comprises a position sensing receiver for receiving position related signals and determining a speed signal from the position related signals.

3. The system as defined in claim 2 wherein said position sensing receiver comprises a GPS receiver for receiving GPS radio wave signals.

4. The system as defined in claim 1 wherein said controller computes the pulse rate of the vehicle speed sensor signal by dividing the pulses counted within the time period by the determined vehicle speed.

5. The system as defined in claim 1 wherein said system is employed in connection with a navigation system.

6. The system as defined in claim 5 wherein said vehicle speed sensor signal is calibrated for use in a dead reckoning technique for the navigation system.

7. A navigation system having a dead reckoning mode of operation, said navigation system comprising:

a GPS receiver for receiving GPS radio wave signals and determining a current position and a GPS based speed of the vehicle when GPS signals are available;

a compass for providing an indication of vehicle heading;

a vehicle speed sensor for generating a vehicle speed sensor signal, said speed sensor signal being a pulsed signal having a pulse ratio that is a function of a particular number of pulses per distance;

a counter for counting pulses of the vehicle speed sensor signal during a time period; and a controller for providing a back up dead reckoning mode of operation for determining an approximation of vehicle location when GPS position information is unavailable, said controller determining position location as a function of vehicle heading and the vehicle speed sensor signal, said controller further providing automatic calibration of the vehicle speed signal while GPS signal information is available by determining a pulse-per-distance ratio of the vehicle speed sensor signal as a function of the GPS based vehicle speed and the pulse count from the counter.

8. The system as defined in claim 7 wherein said controller computes the pulse rate of the vehicle speed sensor signal by dividing the pulses counted within the time period by the GPS based vehicle speed.

9. A method of calibrating a vehicle speed sensor signal for use in a vehicle, said method comprising the steps of:

receiving a vehicle speed reference signal;

determining the speed of the vehicle based on the vehicle speed reference signal;

receiving a vehicle speed sensor signal that is generated by a vehicle speed sensor, said vehicle speed sensor generating the vehicle speed sensor signal as a function of a particular number of pulses per distance;

counting pulses of the vehicle speed sensor signal during a time period;

computing a pulse-per-distance ratio of the vehicle speed sensor signal as a function of the vehicle speed reference signal and the pulse count; and automatically calibrating the vehicle speed sensor signal in accordance with the computed pulse rate.

10. The method as defined in claim 9 further comprising the step of receiving position related signals and calculating the speed reference signal as a function of the position related signals.

11. The method as defined in claim 10 wherein the position related signals are GPS signals.

12. The method as defined in claim 9 further comprising the step of determining vehicle position as a function of the vehicle speed signal for use in a navigation system.

13. A method of providing navigational services to a vehicle, said method comprising the steps of:

receiving GPS radio wave signals;

calculating a GPS determined vehicle speed from the GPS signals when GPS signals are available;

receiving a pulsed vehicle speed sensor signal from a vehicle speed sensor;

determining a ratio of pulses per distance for the vehicle speed sensor signal;

counting pulses of the vehicle speed sensor signal during a time period;

computing a pulse-per-distance ratio of the vehicle speed sensor signal as a function of the GPS determined vehicle speed and the pulse count;

determining vehicle speed as a function of the computed pulse rate when GPS signals are unavailable; and determining the location of the vehicle as a function of said determined vehicle speed.

14. The method as defined in claim 13 wherein the location of the vehicle is further determined as a function of vehicle heading.

\* \* \* \* \*